United States Patent [19]

Wiley

[11] 3,836,916

[45] Sept. 17, 1974

[54] APPARATUS FOR EXPOSING LINES ON A PHOTOSENSITIVE SURFACE

[75] Inventor: John P. Wiley, Vestal, N.Y.

[73] Assignee: International Business Machines Corporation, Armonk, N.Y.

[22] Filed: Feb. 26, 1973

[21] Appl. No.: 336,128

[52] U.S. Cl. .................................................. 354/4
[51] Int. Cl. .................................................. G03b
[58] Field of Search ...................... 95/12, 1 R; 354/4

[56] References Cited

UNITED STATES PATENTS

| | | | |
|---|---|---|---|
| 3,330,182 | 7/1967 | Gerber et al. | 95/1 R |
| 3,688,655 | 9/1972 | Klostermann et al. | 95/12 X |
| 3,695,154 | 10/1972 | Webster | 95/12 X |
| 3,709,125 | 1/1973 | Wiley | 95/12 |

*Primary Examiner*—Samuel S. Matthews
*Assistant Examiner*—Kenneth C. Hutchison
*Attorney, Agent, or Firm*—Kenneth P. Johnson

[57] ABSTRACT

Apparatus for exposing lines on a photosensitive surface by means of relative movement between a light beam and the surface in which the quantity of radiant energy impinging upon the surface is controlled by movable, opaque blades that block variable portions of the light beam, with the blade movement being varied in accordance with the relative velocity between the beam and surface. A rectangular aperture is used to define the shape of the beam and the blades are oppositely moved along the direction of travel of the aperture to alter the quantity of light admitted therethrough. Several embodiments of this apparatus are disclosed and include blades having straight ends, variously shaped ends, and a variable iris diaphragm, all of which can controllably limit energy impingement upon the photosensitive surface.

13 Claims, 13 Drawing Figures

APPARATUS FOR EXPOSING LINES ON A PHOTOSENSITIVE SURFACE

BACKGROUND OF THE INVENTION

The invention relates generally to devices for exposing lines on materials having photosensitive surfaces and more particularly to such apparatus as adapted to the construction of photographic master masks or to the exposure of photoresist coated parts such as printed circuit boards, integrated circuits, etc.

Several machines are known which can selectively expose lines on photographic masters along either Cartesian or polar coordinates. These machines have assorted compensating devices to vary the quantity of impinging radiation on the photosensitive surface during changes in relative velocity between the exposing light beam and surface. Such devices have included the use of variable density filters, lamp intensity control circuits and a shutter blade to move across the exposing aperture, each being altered at a rate proportional to the beam-surface velocity.

Most of the known devices work well when exposing conventional, highly sensitive, wide-latitude materials such as silver halide, but do not provide adequate exposure control when the photosensitive material requires relatively large, accurately controlled amounts of actinic radiation as is required with photoresists and, more particularly, the film type photoresists. In order to obtain good exposure at the desired high velocity, it has been found that the aperture producing the shaped beam should extend along the direction of movement as far as is permitted by the light source and condensing system. This configuration thus requires that the aperture extend for a considerable distance beyond the optical axis of the system in the direction of beam travel. Such an aperture provides uniform exposure when velocity is constant throughout the exposing travel. However, when experiencing acceleration or deceleration between the beam and sensitized surface, overexposure results. In addition, when a line must change direction, the tracing system must stop at a predetermined distance from the change of direction, then proceed to a second predetermined point without exposure, stop again, and finally initiate tracing in the new direction. This is necessary to avoid overextending a line.

The most suitable of the known exposing devices uses one computer-controlled blade which exposes the aperture in accordance with the relative velocity. This device, however, operates on only half of the aperture in the direction of movement, which reduces exposure by one-half. The controlled blade movement requires a computer to determine the velocity with which the reticle is uncovered, and the time delay after initiating blade movement before the beam is moved relative to the sensitized surface. Although the device is constructed with two blades, only one blade is operated during an exposure run, depending upon the direction in which the beam is moved relative to the sensitized surface. This arrangement permits uniform exposure but also requires the use of a computer for determining and adjusting the repositioning of the optical axis relative to the surface when constructing a junction between two lines, for example, along X and Y coordinates. If no computation is done for the starting point of the optical axis, an unexposed notch remains at the intersection. The computation and repositioning of the light generating mechanism or table supporting the sensitized surface decrease operational efficiency.

It is accordingly a primary object of this invention to provide exposure apparatus having aperture control blades which move simultaneously and oppositely to control exposure in accordance with the relative velocity between the light beam and sensitized surface.

Another object of this invention is to provide exposure apparatus having aperture control blades operating in accordance with relative velocity between the beam and sensitized surface which does not require a computer and, hence, is simpler and less expensive.

A further object is to provide apparatus having aperture control blades which are operated in a manner providing for the utilization of the maximum field of the light source and condensing system, hence, being capable of twice the tracing speed of those devices wherein one blade is held fixed.

It is a further object of this invention to provide apparatus having a rectangular exposure aperture with illumination control blades that obviate the requirement of recomputing the location of the optical axis when producing intersecting lines.

A further object of this invention is to provide apparatus for exposing lines on a photosensitive surface in which the apparatus includes novel control blades that allow the longitudinal axis of the rectangular aperture to be changed 90° without changing the blade orientation.

A still further object of this invention is to provide line exposure apparatus for sensitized surfaces in which adequate exposure is assured during periods of acceleration and deceleration by using a plurality of aperture control blades to provide novel exposure which prevents possible loss of line continuity and definition during subsequent development of the surface.

SUMMARY OF THE INVENTION

The foregoing objects are attained in accordance with the invention by providing a source of illumination and a support for a photosensitive material relatively movable along orthogonal axes, optical means for directing light from the source to the sensitized surface, means for defining an aperture to determine the image formed by the beam on the photosensitive material and a plurality of simultaneously movable opaque blades to vary the image in accordance with the velocity between the beam and sensitized surface. The basic device operates by two blades which are located approximately in the plane of the aperture and in the focal plane of the projection lens. Images of these blades are formed on the photosensitive surface and these images will hereafter be treated as though they were the actual blades. The apparatus of the invention can accommodate a rectangular aperture of variable length to width ratio and perform line terminations at approximately the optical axis of the beam even though the aperture may be much longer than the line width.

Blade displacement is constrained to be proportional to the relative velocity between the photosensitive material and the optical axis. This does not give theoretically correct exposure, but is an excellent approximation and permits uniquely simple and inexpensive embodiments of the invention. In FIGS. 1*a* and 1*b*, the displacement $s$ of blades 21 and 22 relative to sensitized surface 17 is given in terms of table velocity $v$ by:

$s = kv$ The constant $k$ is equal to the required expose time and may be found from the maximum reticle length $L$, and the maximum velocity of the table, $v_{(max)}$:

$$k = \frac{s}{v} = \frac{\frac{L}{2}}{v_{(\max)}} \qquad k = \frac{L}{2v_{(\max)}}$$

Blade opening is then given by:

$$s = L/2v_{(max)}v$$

The effect of this approximation is determined by calculating exposure time, assuming a constant acceleration $a$. For convenience, the optical axis has been considered as in motion, but only the relative velocity is significant.

$x+s$ = location of leading blade
$x-s$ = location of trailing blade
$z$ = location of an arbitrary point on surface 17
$t_1$ = start of exposure time
$t_2$ = end of exposure time
start of exposure: $z = x_1+s_1$
end of exposure: $z = x_2-s_2$ Elementary mechanical analysis then gives the expose time:

$$t_1 = \frac{-ka \pm \sqrt{k^2a^2+4az}}{2a} = \frac{-k+\sqrt{k^2+\frac{4z}{a}}}{2}$$

$$t_2 = \frac{+k+\sqrt{k^2+\frac{4z}{a}}}{2}$$

$$t_2 - t_1 = k = \frac{L}{2v_{(\max)}}$$

This is the theoretically correct value and no error is introduced. However, for negative values of $z$, exposure is determined by only one blade:

$$\Delta t = \frac{k+\sqrt{k^2+\frac{4z}{a}}}{2} - \left[\frac{k-\sqrt{k^2+\frac{4z}{a}}}{2}\right] = \sqrt{[k^2+\frac{4z}{a}}$$

This again reduces to $k$ for $z=0$. Some level of exposure does improperly exist for values of $z$ less than zero. This becomes zero for:

$$z = -a/16(L/v_{(max)})^2$$

The line will be overextended by something less than this amount. In actual applications this quantity is very small, and tends to compensate for time lag in blade motion due to inertia, so that the overextension of the line is not ordinarily observable.

One form of the invention uses opposing V-notches in a pair of simultaneously movable blades which are controlled by the magnitude of the velocity signal. The blades operate between limits exposing the entire rectangular aperture and a minimal diamond shape, the diagonal of which is equal to or slightly less than the width of the rectangular aperture. A further variation is the use of an adjustable iris diaphragm having a maximum diameter that will accommodate the rectangular aperture oriented in any direction relative to the diaphragm. The diaphragm is movable from the position exposing the entire aperture to a minimum size beam having a diameter equal to or slightly less than the width of the aperture. Other modifications include opposing blades with straight or concave edges.

This invention has the advantage of eliminating the need of a computer or servo system to control the blade positioning, which is done solely on relative velocity. Control is according to an approximation with extremely small error which is negligible. The structure obviates any control of the light intensity. The invention further permits the construction of junctions between lines with a constant line width at the juncture. In the preferred forms, no correction is required for optical axis location when changing from movement along one axis to movement along another and, although the line generated is overexposed at its center, exposure at the edge is maintained. This is of significant value in assuring that no line discontinuity occurs during acceleration or deceleration due to minor lag or delay in blade motion. The necessity for extremely precisely controlled blade motion is eliminated resulting in very considerable reduction in cost. It is also technically feasible to obtain higher operating speeds and larger accelerations than are otherwise possible.

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

Figure 2:
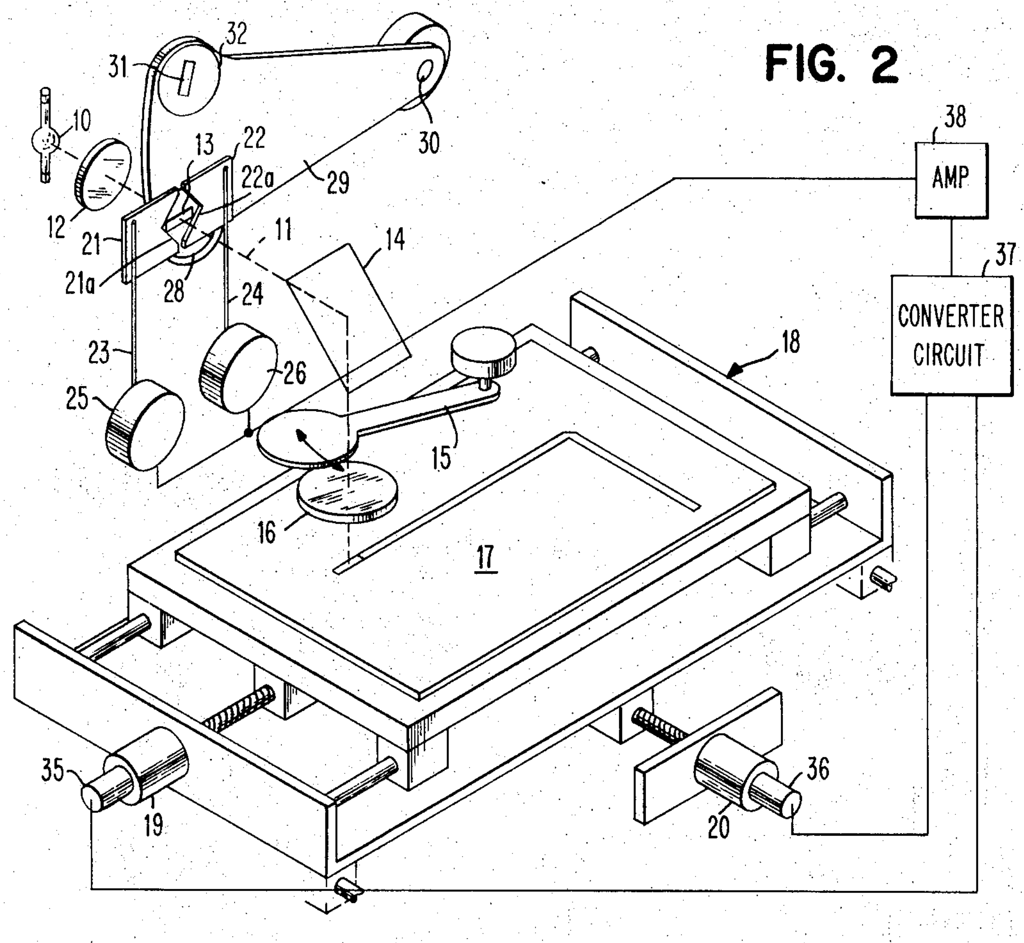
FIG. 2 is a schematic diagram of exposure apparatus incorporating the invention.
Figure 1A:
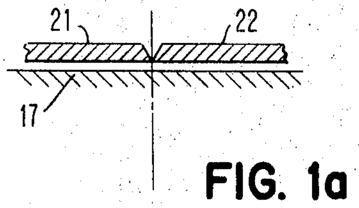
FIGS. 1*a* and 1*b* are schematic illustrations of the theory of the invention.

Referring to FIG. 2, exposure apparatus according to the invention includes a suitable light source 10 producing a beam of actinic light 11 formed so to have an optical axis directed through a condensing lens 12 and a beam forming aperture 13, reflected from a pathbending mirror 14, past a control shutter mechanism 15 and through an objective lens system 16 which forms an image of aperture 13 and blades 21 and 22 on photosensitive material 17. The photosensitive material is supported for movement relative to the impinging beam 11 on a suitable support such as an X—Y table 18 having respective drive mechanisms 19 and 20 for producing movement of the table along Cartesian coordinates. Also encompassing the beam 11, between aperture 13, and mirror 14, are a pair of blades 21 and 22 mounted on respective arms 23 and 24 that are secured to actuators, such as galvanometric movements 25 and 26. Each of the blades 21, 22 has a respective V-notch 21a, 22a formed in the edge of the blade adjacent the opposite blade. The blades are mounted for limited oscillatory movement toward and away from each other from a position fully exposing reticle 13 or closing the reticle to a diamond-shaped aperture having a dimension equal to or slightly less than the minimum dimension of the aperture 13. Such movement in this limited degree is approximately linear provided arms 23 and 24 are of sufficient length. The two galvanometric movements are each controlled in accordance with the relative velocity between the beam 11 and photosensitive material 17 during exposure of the latter, and will be more fully described below.

It will be noted that aperture 13 is rectangular in shape and that the aperture is formed in a disk 28 supported in a control arm 29 which is movable by a rotary solenoid shaft 30. Located in the upper portion of the control arm is a second aperture 31 formed in disk 32 also held in control arm 29. This latter aperture is located at the same distance from the pivot as the former aperture, but is oriented at 90° with respect thereto. The reason for this arrangement of apertures is to enable changing the configuration of the exposing light beam 11 when changing the axis along which exposure is to occur. The apertures 13 and 31 are arranged so that the longitudinal axis of the aperture lies along the direction of movement of the photosensitive material. It is also understood that a plurality of such aperture pairs may be provided for various line widths.

The galvanometric control units 25 and 26 for moving blades 21 and 22 are energized, as stated above, in proportion to the relative velocity between the beam and sensitized material 17. This control is obtained through tachometers 35 and 36 attached to respective X and Y drive mechanisms for the supporting table 18. These tachometers provide output voltages proportional to the operating speed of their axis drives and are supplied to a well-known converter circuit 37 which produces only positive output voltages regardless of the direction in which the axis drive units are operating. This output voltage is supplied to an amplifier 38 and the amplifier output is fed in parallel to each galvanometric control unit so that identical amounts of movement are produced at each blade 20 and 21, but in opposite directions. The galvanometer movements are set to assume a position at zero input voltage such that the blades 21 and 22 are at their closed position, that is, with a minimum beam size permitted to pass therethrough. Thus, as table 18 is started along either axis or combination of axes, a signal of increasing magnitude is supplied in proportion to the relative velocity which will tend to retract the aperture control blades to expose a larger portion of the aperture and thereby permit a beam of larger size to impinge upon sensitized surface 17. Likewise, upon slowing, a signal of decreasing amplitude allows the blades to move toward each other.

Although the invention has been shown using a pair of blade actuators for blade control it will be recognized that a single actuator can be used by devising a linkage interconnecting the blades. Such linkage tends to be as costly as a duplicate actuator and introduces additional errors. It may also be unreliable or erratic unless made with extreme care.

Photosensitive material 17 may be any of several well known light sensitive compositions, such as silver halide, diazo compounds or photosensitive resist materials commonly used in printed circuit production. The invention is well adapted for use in the exposure of photoresists, and particularly the film type resists such as Riston, a product of E. I. DuPont de nemours, Inc. or Laminar, a product of Dynachem Corp. Such resists are applied by lamination to substrates that have a layer of copper thereon or are sensitized to produce the deposition of copper when immersed in an electroless copper bath.

The film type resists require light in the ultraviolet range and several times the quantity of light energy is needed as compared to silver halide. The latter material is frequently used in the preparation of masks for printed circuits while the film type resists are used for the customized, serial, direct exposure of substrates. Because of the need of a greater exposure, the aperture forming the exposing beam is made in a rectangular configuration having its axis parallel with the direction of movement of the beam relative to the light sensitive material as long as is consistent with the optical field of view. With this shape, greater quantities of light are permitted to impinge the sensitized material.

However, in those situations where exposure is made while the sensitized material is started, moved, and brought to a stop, the quantity of actinic light becomes disproportional along the line of exposure. During periods of acceleration and deceleration, excessive amounts of light energy impinge on the surface and produce overexposure with resulting line widening. In addition, there may be irregular acceleration or deceleration, thus producing variations in the exposure which will produce line width variations when the sensitized material 17 is developed. Proper exposure is obtained through the operation of opposed blades 21 and 22 which automatically vary the opening to produce essentially a uniform exposure during velocity changes.

Figure 3A:
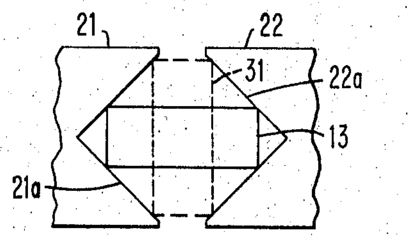
FIGS. 3*a* and 3*b* are diagrams showing the relative positions of the aperture and control blades shown in FIG. 2.
Figure 1B:
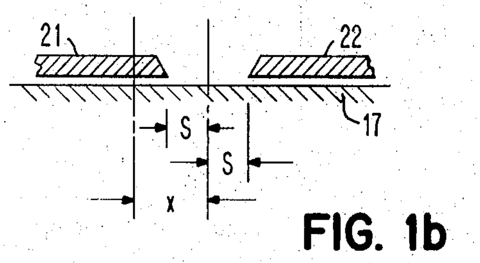
Figure 3B:
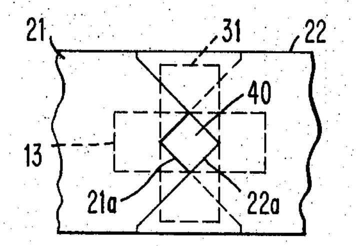
Figure 4A:
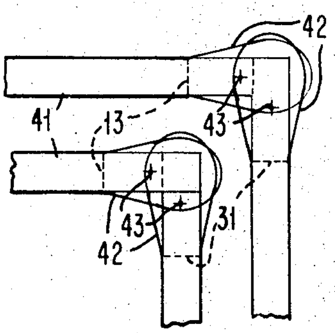
FIGS. 4*a* and 4*b* are diagrams of the exposure of photosensitive material made with and without use of the apparatus shown in FIG. 2.
Figure 4B:
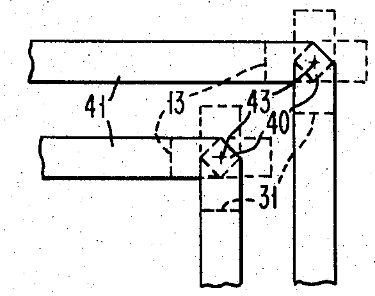
Figure 5A:
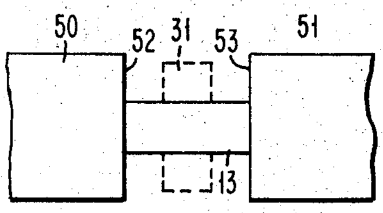
FIGS. 5*a*, 5*b*, 6*a*, 6*b*, 7*a* and 7*b* are diagrams of modifications of the control blades shown in FIG. 2.
Figure 5B:
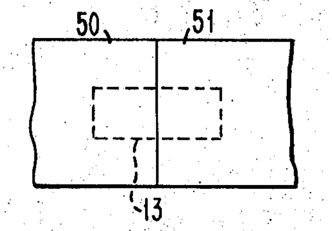
Figure 6A:
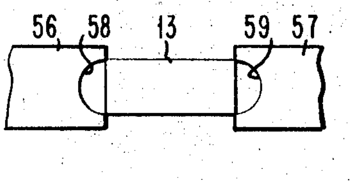
Figure 6B:
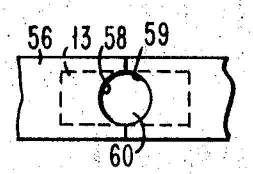
Figure 7A:
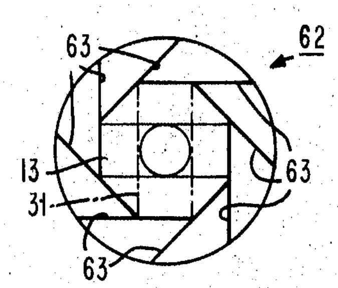
Figure 7B:
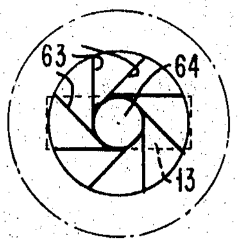

In FIGS. 3*a* and 3*b* are illustrated the relationships between blades 21 and 22 and apertures 13 and 31. In FIG. 3*a*, control blades 21 and 22 are shown in the retracted position fully exposing the apertures when oriented along either the X or Y axis; the Y axis aperture 31 is indicated in broken line. It will be noted that the V-notches 21*a* and 22*a* in the respective blades are nearly coincident with the corners of the apertures. As the blades begin to move toward the extended or closed position, the opaque blades will start to cover the aperture in either position. With continued movement of the blades toward each other, they will reach the position shown in FIG. 3*b* in which blade 22 is shown overlapping blade 21. At the conclusion of movement, the small diamond-shaped opening 40 remains. The movement of the two blades toward the closed position is limited when the points of the diamong shaped opening are coincident with or entirely within the width of the apertures 13 or 31.

The V-shaped notches in the opposing blades provide several significant advantages. By making the sides of each V-notch perpendicular to each other, and arranging the blades so that the joint opening provided is substantially square in the closed position, the blades need not be repositioned when aperture 13 is replaced by aperture 31. In either case, of course, the rate at which the aperture is blocked by the blades will be the same whether horizontal or vertical orientation is present. The limit of movement of the blades 21 and 22 toward each other can be varied by adjustable stops (not shown) so that the diagonal of the diamond-shaped opening at its corners is equal to or slightly less than the width of the aperture. When this occurs, there is no overexposure at the edge of the exposed line. The width of the opening is usually only slightly smaller than the aperture width.

A further advantage is illustrated with the aid of FIGS. *4a* and *4b*. When using a rectangular aperture without blade control of the aperture size, the exposed lines 41 tend to widen at the terminations 42 thereof whether at the beginning or end of an exposed line. This is illustrated by the tendency of lines 41 to become wider in FIG. *4a*. In the production of printed circuits, such a condition reduces the reliability of the exposed circuits since there may be sufficient overexposure to cause contact between adjacent lines, resulting in short circuits and thus also limits the permissible distance between adjacent lines.

A further difficulty in exposing with rectangular reticles is seen by noting the location of the relative position of the two exposing apertures 13 and 31 and the optical axis 43 of each when making the junctions between two exposed lines. During exposure, the movement of the X-Y table is usually under numerical control. Upon termination of a line along one axis the exposed line portion will extend beyond the beam axis for approximately half the length of the aperture. Because the two optical points of impingement of the two optical axes do not coincide, the computer must make a compensating adjustment of table position to ensure that the adjoining line ends appropriately coincide and do not overextend to produce a possible short cirucit. This compensating action adds to the exposing time required during operation of the apparatus.

It will be seen in FIG. *4b* that the use of opposing blades with symmetrical V-notches therein can be used to enable coincident impingement of the optical axes when the aperture is oriented along either the X or Y axis. Although the sensitized material will be overexposed at the line center by the small diamond-shaped opening 40, this is not detrimental because exposure at the line edge is correct. As seen in the FIG. *4b*, line widening can be controlled so that adjacent lines can be reliably and closely located next to each other.

A modified configuration of blades 21 and 22 is shown in FIGS. *5a* and *5b*. In this embodiment the opposing blades 50 and 51 each have straight edges 52, 53 at their opposing faces. The blades operate between the retracted position fully exposing aperture 13 and an extended or closed position in FIG. *5b* in which aperture 13 is completely covered. This embodiment will provide intensity control of the light beam 11 when passing therethrough similar to the V-notch blades above. There is, however, no provision for the angularly formed corners at line intersections. Neither does the modification lend itself readily to control of aperture 31 when orthogonally oriented with respect to aperture 13, and means for rotating the blade assembly or an additional set of blades must be provided. Table position adjustment is also required to ensure that abutting lines coincide. This embodiment does possess the advantage that no overexposure is introduced. It is, therefore, applicable to extremely high resolution requirements, but considerable precision in blade motion is required, and machine speed will, in general, be severely curtailed.

A further modification may be made to control blades as shown in FIGS. *6a* and *6b*. In this embodiment the blades 56, 57 are formed with concave, opposite openings 58, 59 in the adjacent edges of the blades. This blade arrangement is suitable for operation with the aperture 13 but would be unsuitable for control of an aperture located at 90° therewith. A second set of blades may, however, be used for aperture 31. As can be seen in FIG. *6b* when the blades are in their extended position a circular opening 60 remains. The diameter, of course, can be made equal to or slightly less than the width of the aperture. This embodiment permits the construction of well-rounded corners at line junctions and again prevents widening during the slow relative motion or when stopped. If an attempt is made to enlarge the blades to accommodate both apertures 13 or 31, there is, of course, a loss of control at the closed position of the blades since light is not restricted to less than width of the aperture.

The principle of the invention may also be implemented by the well-known adjustable iris diaphragm 62 with its plurality of movable blades 63 as shown in FIGS. *7a* and *7b*. In FIG. *7a*, an adjustable diaphragm device mechanism, such as used as a variable aperture stop in a camera, is shown expanded so as to provide an opening which will accommodate aperture 13 or 31 without obstruction. During operation the mechanism is contracted according to the velocity signal so as to provide a circular opening 64 again equal to the width of the rectangular aperture or slightly less than that dimension when velocity is zero. This diaphragm mechanism readily allows the construction of rounded corners at intersecting lines. Also, the variable orientation of the beam forming aperture at any desired angle can be accommodated. A multiplicity of apertures similar to 13 and 31 will then provide capability for tracing at angles. These mechanisms are usually operated by a single cam ring which can be actuated by a single actuator or, in this case, one galvanometric movement as opposed to the dual units shown for twin blades.

Shutter mechanism 15 in FIG. 2 provides a control means for blocking all light impingement. It is selectively employed so as to prevent undesired exposure or overexposure during the setup or removal of sensitized material 17 or during periods of repositioning of the beam or sensitized material for a new line.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for exposing a line on photosensitive material comprising:

a source of light;

means for supporting photosensitive material thereon;

optical means for directing a beam of light from said source to the photosensitive material on said support means;

means providing an aperture for forming the shape of said beam;

means for relatively moving said support means and said beam;

means for generating an output signal of variable amplitude in proportion to the velocity of said relative movement;

a plurality of movable opaque blades; and means responsive to said output signal for moving said blades uniformly and simultaneously to block varying portions of said light beam passing beyond said aperture means.

2. Apparatus as described in claim 1 wherein said blades are formed to leave a predetermined minimum beam portion unblocked regardless of the magnitude of said signal.

3. Apparatus as described in claim 2 wherein said blade plurality is formed so that the largest dimension of said minimum beam portion is smaller than the minimum dimension of said aperture.

4. Apparatus as described in claim 1 wherein said blade plurality is a pair of oppositely movable blades.

5. Apparatus as described in claim 4 wherein said blades are formed at their adjacent ends with opposing concave surfaces.

6. Apparatus as described in claim 4 wherein the movement of each blade in said plurality is the same amount with respect to the optical axis of said beam when said blades move in accordance with said signal.

7. Apparatus as described in claim 4 wherein said blades are formed at their adjacent ends with opposing V-shaped notches.

8. Apparatus as described in claim 4 wherein said aperture is a non-square rectangle and said blades move substantially along the longitudinal axis of said aperture.

9. Apparatus as described in claim 4 wherein said blades move substantially transversely to the direction of relative motion between said beam and said support means.

10. Apparatus as described in claim 1 wherein said blade plurality is formed as a variable iris diaphragm having three or more blades.

11. Apparatus as described in claim 1 wherein said aperture means forms a rectangle and further includes means for varying the position of said rectangle relative to the position of said blade plurality.

12. Apparatus as described in claim 1 wherein said aperture means includes a plurality of apertures and means for selecting one of said plurality of beam forming apertures.

13. Apparatus as described in claim 1 wherein said blade movement is substantially along a line parallel to the direction of relative motion between said beam and said support means.

* * * * *